United States Patent [19]

Fiden

[11] Patent Number: 4,954,329

[45] Date of Patent: Sep. 4, 1990

[54] DATA LINK USING ELECTRONICALLY STEERABLE BEAM

[75] Inventor: William H. Fiden, Los Angeles, Calif.

[73] Assignee: Hughes Aircraft Company, Los Angeles, Calif.

[21] Appl. No.: 329,459

[22] Filed: Mar. 28, 1989

[51] Int. Cl.[5] ............................................. G01S 13/86
[52] U.S. Cl. .................................................... 342/60
[58] Field of Search ................... 342/60, 62, 368, 371, 342/372

[56] References Cited

U.S. PATENT DOCUMENTS

| | | | |
|---|---|---|---|
| 4,216,472 | 8/1980 | Albanese | 342/7.3 |
| 4,724,441 | 2/1988 | Fithian et al. | 342/368 |
| 4,733,238 | 3/1988 | Fiden | 342/60 |
| 4,749,995 | 6/1988 | Hopwood et al. | 342/371 |
| 4,764,769 | 8/1988 | Hayworth et al. | 342/50 |

OTHER PUBLICATIONS

"Introduction to Radar Systems", Merrill I. Skolnik, pp. 161-167, McGraw Hill, 1980.

Primary Examiner—Thomas H. Tarcza
Assistant Examiner—Mark Hellner
Attorney, Agent, or Firm—R. M. Heald; R. A. Hays; W. Denson-Low

[57] ABSTRACT

An improved direct, two-way data link is disclosed. The improved data link is used with an electronically steerable active array 10. The uplink comprises a transmitter radar means 60 mounted in a first vehicle for providing a first data signal and transmitting this first data signal as a first radar data signal to a second vehicle and radar receiver means 130 mounted in this second vehicle for extracting the first data signal from the first radar data signal. The downlink comprises transmitter radar means 150 mounted in the second vehicle for providing a second data signal and transmitting this second data signal as a second radar data signal and radar receiver means 80 mounted in the first vehicle for extracting the second data signal from the second radar data signal.

28 Claims, 2 Drawing Sheets

DATA LINK USING ELECTRONICALLY STEERABLE BEAM

BACKGROUND OF THE INVENTION

1. Field of the Invention:

The present invention relates to radar systems. More specifically, the present invention relates to direct, two-way radar data links.

While the present invention is described herein with reference to an illustrative embodiment for a particular application, it is understood that the invention is not limited thereto. Those of ordinary skill in the art and access to the teachings provided herein will recognize the additional modifications, applications and embodiments within the scope thereof.

2. Description of the Related Art:

Conventional two-way, continuous data links optimize midcourse guidance to direct a missile from a launch aircraft to the vicinity of a target. Some data links provide for a missile guidance system that not only enables the missile to receive messages from the aircraft but also enables the missile to communicate messages back to the aircraft.

Prior techniques for aircraft-to-missile communication include fiber optic guided and wire guided systems. However, both of these techniques have a payout that is too slow for the environment of modern high speed aircraft.

Radar based data links obviate the payout problem. As many aircraft have a preexisting radar onboard for fire control (FC), such systems have been considered for data link applications as well as fire control. In conventional airborne FC radar, a mechanically steerable array is used for missile guidance and communication. Two significant limitations of mechanical scanning antennas relate to the narrow beam and the high inertia associated therewith. Both of these limitations affect the ability of the aircraft to communicate effectively with the missile.

Generally, these antennas transmit a relatively narrow beam. As the mainlobe of the beam must generally be positioned at the target, the inertia associated with the antenna makes it virtually impossible for the antenna to be switched simultaneously from being aimed at the target to being aimed at the missile.

Thus, a conventional FC radar antennas can generally only transmit data link messages to the missile through the sidelobes. However, the sidelobes are typically weak compared to the mainlobe. Hence, the associated limited level of the sidelobes tends to limit the operating range of the data link. This is especially problematic when the target is attempting to jam the radar or when low power radar transmission is used to minimize the probability of intercept.

Thus, there clearly exists a need in the art for a missile guidance system which uses a missile with a low power transmitter and is able to not only receive data from the FC radar but is also able to communicate therewith.

SUMMARY OF THE INVENTION

The need in the art for a low power, direct, two-way data link is addressed by the improved data link of the present invention. The improved data link is used with an electronically steerable active array which allows the radar beam to scan from the target to the missile instantaneously since electronic rather than mechanical beam steering is utilized. The uplink comprises a transmitter radar means mounted in a first vehicle (i.e. aircraft) for providing a first data signal and transmitting this first data signal as a first radar data signal to a second vehicle (i.e. missile) and radar receiver means mounted in this second vehicle for extracting the first data signal from the first radar data signal. The downlink comprises low power transmitter means mounted in the second vehicle for providing a second data signal and transmitting this second data signal as a second radar data signal and radar receiver means mounted in the first vehicle for extracting the second data signal from the second radar data signal. As a result, the missile is able to communicate status and information about itself and the target back to the FC radar.

DESCRIPTION OF THE INVENTION

Figure 1:
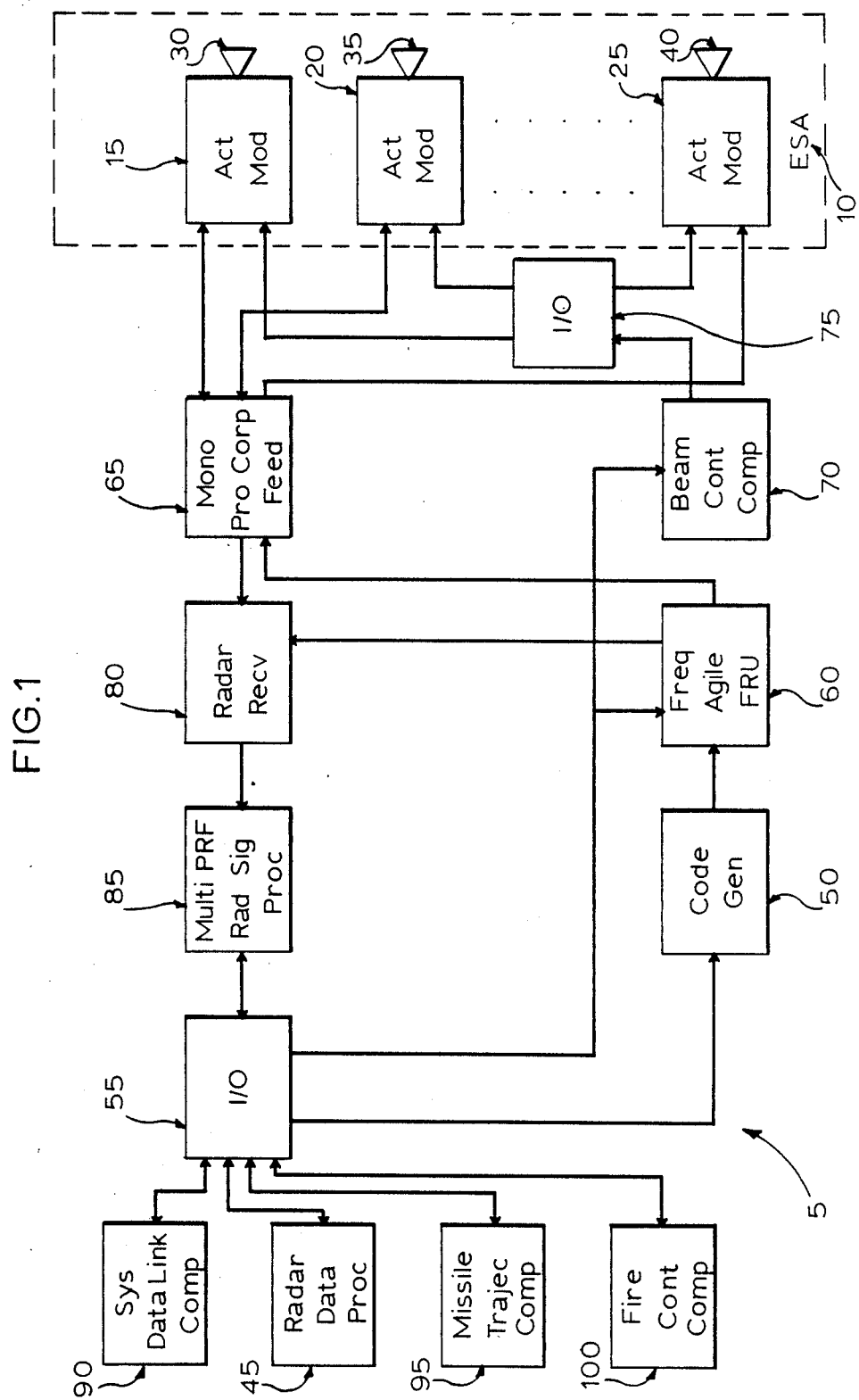
FIG. 1 is a block diagram of an active array fire control radar and a two-way data link terminal in accordance with the present teachings.

FIG. 1 shows a block diagram of an active array fire control radar 5 constructed in accordance with the teachings of the present invention. The system 5 can instantaneously perform traditional radar functions (i.e. track while scan) while communicating with a missile. The radar and communication functions are made possible by an electronically steerable array 10. The electronically steerable array 10 is composed of an array of active modules, of which three are shown for illustration 15, 20 and 25. As described more fully below, each of the active modules is connected to a corresponding element in the array of antenna radiating elements of which three are shown 30, 35 and 40, respectively.

For normal radar functions a radar data processor 45 produces a signal and sends it to a code generator 50 via an input/output interface 55. The code generator 50 provides random coding for selecting operating frequencies. The radar signal is passed from the code generator 50 to a frequency agile frequency reference unit (FRU) 60. As is known in the art, the FRU generate the appropriate radar signal waveform for a given application. The radar signal is passed to a corporate feed 65 which selectively feeds the radar signal to the active modules, 15, 20 and 25. From the active modules 15, 20 and 25 the radar signal is passed to the antenna radiating elements 30, 35 and 40, respectively.

A beam control computer 70 executes algorithms for controlling the steering of the array. The beam control computer produces the amplitude and phase controls for each active module 15, 20 and 25, which is distributed by an input/output interface 75.

When the radar signal is reflected by a target, the return pulse is received by the antenna elements 30, 35 and 40, and is passed through the active modules 15, 20 and 25, respectively. The received radar signal is then passed to a monopulse processor 65 which collects the returned radar signal and generates sum and difference signals. This information is provided to a conventional radar receiver 80. The radar receiver 80 produces angle information for input to a multiple pulse repetition frequency (prf) radar signal processor 85. The multiple prf radar signal processor 85 performs the conventional radar functions (e.g. searching and mapping) and provides such information to the radar data processor 45 via the input/output interface 55. The output of the multiple prf radar signal processor 85 is also provided to a fire control computer 100. The fire control computer 100 controls heads up displays and provides tracking information to the beam control computer 70 as is known in the art.

In accordance with the present teachings, two way communication is also provided by the system 5. For a two way data link with a missile, a system data link computer 90 initializes the system 5 to provide communication functions. Depending on the type of message to be communicated (i.e. status or coordinate positioning), data signals originate from either a missile trajectory computer 95 or the fire control computer 100. The data signals are sent to the code generator 50 via the input-/output interface 55. The code generator 50 provides random coding for selecting message transmission times. The data signals are input from the code generator 50 to the frequency agile frequency reference unit (FRU) 60 which provides waveform generation of data link functions. The radio frequency (RF) or radar data signals are provided to the corporate feed 65 which distributes the RF data signals to the collection of active modules 15, 20 and 25. From the active modules 15, 20 and 25 the RF data signals are passed to the antenna elements 30, 35 and 40, respectively. In the data link mode, a beam control computer 70 controls the active modules to steer a beam containing the radar data signals to the missile from information obtained from the missile trajectory computer 95 via the input/output interface 55. Thus, the radar data signals are transmitted by the antenna elements 30, 35 and 40 to the missile.

Figure 2:
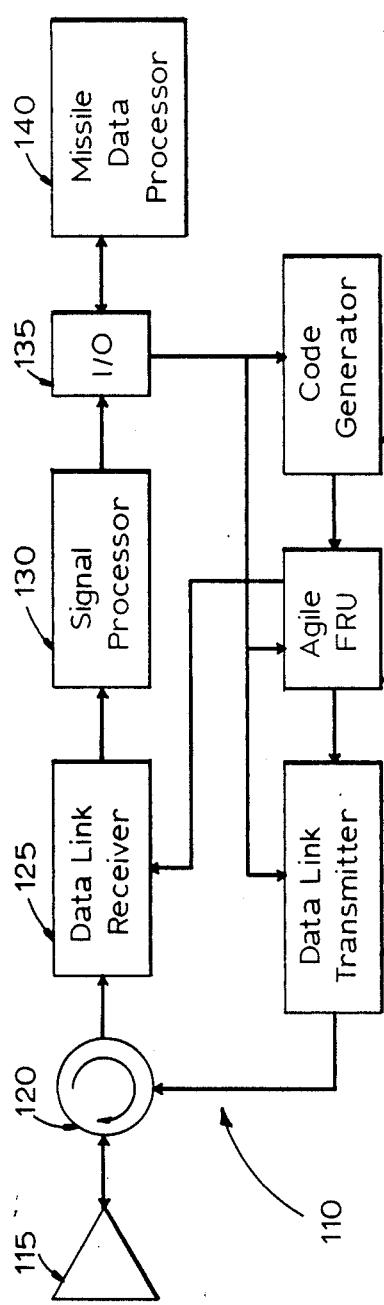
FIG. 2 is a block diagram of a two way missile data link terminal constructed in accordance with the present teachings.

FIG. 2 is a block diagram illustrative of a two way missile data link terminal 110 constructed in accordance with the present teachings. The radar data signals from the fire control radar 5 are received by an antenna 115 and routed via a coupler 120 to a data link receiver 125. The data link receiver 125 downconverts the radar data signals in a conventional manner. A signal processor 130 receives the radar data signals from the data link receiver 125 and converts the analog radar data signals output thereby to digital data signals. The digital data signals are forwarded to a missile data computer 140 via an input/output interface 135. The missile data computer 140 interprets the data signals to provide control and steering of the missile in a conventional manner.

A particularly advantageous feature of the present invention is that the missile data processor 140 is not only able to receive information from the fire control radar 5 but it is also able to transmit target information unknown by the fire control radar 5 back to the fire control radar 5. This transmission begins with data signals from the missile data computer 140 to a code generator 145 via the input/output interface 135. The code generator 145 provides random coding for the operating frequencies and passes the data signals to an agile FRU 150. The FRU 150 generates RF data signals which are sent to a data link transmitter 155. The data link transmitter 155 provides the RF data signals to the antenna 115 via the coupler 120.

Returning now to FIG. 1, the RF data signals, transmitted by the antenna 115, are received by the fire control radar 5 under the direction of the system data link computer 90. The transmitted data signals are passed from the antenna elements 30, 35 and 40 to the active modules 15, 20 and 25, respectively. The RF data signals are passed to the monopulse processor 65 and then to the radar receiver 80. The radar receiver 80 downconverts the RF data signals to analog data signals. A multiple PRF radar signal processor 85 converts the analog data signals to digital data signals. The digital data signal are then communicated to the radar data processor 45 and the system data link computer 90 via the input/output interface 55.

Figure 3:
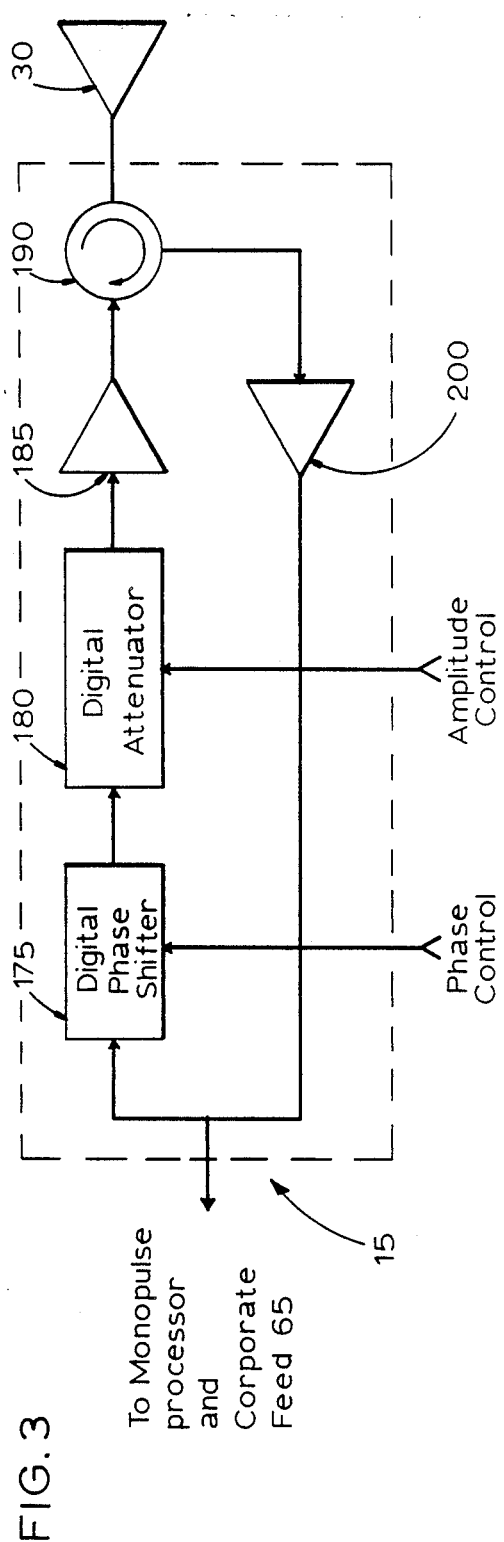
FIG. 3 is a block diagram of an active module of an electronically steerable array antenna as utilized in the present invention.

FIG. 3 is a block diagram of an active module 15 of the electronically steerable array 10. In a transmit mode, radar and data signals are fed to a digitally controlled phase shifter 175. The phase shifter 175 shifts the phase of the signals under control of the beam controller 70. The output of the phase shifter 175 is fed to a digitally controlled attenuator 180. The attenuator 180 attenuates the amplitude of the signals under the direction of the beam control computer 70. The resulting outputs are amplified by a transmitter amplifier 185 and fed to an antenna 30 for transmission via a coupler 190.

In a receive mode, the antenna 30 receives radar data signals which are passed to a receiver amplifier 200 via the coupler 190. The output of the receiver amplifier 200 is provided as an output of the active module 15.

Those skilled in the art will recognize that by controlling the phase shifter 175 and the attenuator 180 of each active module 15, 20 and 25, the resulting radar and data signals can be properly steered. For example, if the phases of the radar data signals are equivalent, the direction of the resulting signal is perpendicular to the antenna 5. However, if the phases are progressively shifted from one active module 15, 20 or 25 to the next, the direction of maximum radiation of the signal will be correspondingly shifted. By simultaneously manipulating 15 the amplitude of each active module 15, 20 or 25, the range of the resulting signal can be lengthened or shortened. The amplitude is also manipulated to control the power density across the distribution of antenna elements 30 to reduce antenna sidelobes.

Those skilled in the art will appreciate that an improved data link has been disclosed which provides for a two-way, direct data link between an aircraft and its missile. The active array of the present invention allows the radar beam to scan both target and missile instantaneously since electronic rather than mechanical beam steering is utilized. The active array antenna arrangement permits the FC radar to be aimed directly at the missile. In other words, a main lobe is used to send data messages to the missile as well as to the target. A particularly advantageous feature of the present invention is that by eliminating the reliance on sidelobes for communication with the missile, the system requires much less power. As a result, a substantial power margin is available for a greatly extended operating range and there is a significant improvement in jamming margin. In addition, this lower power requirement makes it practical to advantageously employ low probability of intercept strategies.

Although, the present invention has been described herein with reference to a particular embodiment for a particular application. Those having ordinary skill in the art and access to the present teachings will recognize additional modifications applications and embodiments within the scope thereof. For example, the system described by the present invention can provide multiple tracking for more than one target. Also, the system can provide multiple communication data links to more than one missile. In addition, the system can provide random timing and random operating frequency selection. Furthermore, the system can utilize passive modules in place of active modules.

It is therefore intended by the appended claims to cover any and all such applications, modifications and embodiments within the scope of the present invention.

Accordingly,

What is claimed is:

1. A missile data link comprising:
   radar transmitter means mounted in a first vehicle for providing a radar signal;
   data transmitter means mounted in said first vehicle for providing a first radar data signal;
   array antenna means mounted in said first vehicle for electronically steering an output beam containing said radar signal and said first radar data signal;
   radiating element means mounted on said first vehicle for receiving a second radar data signal;
   data receiving means mounted in a second vehicle for receiving said output beam and processing said radar data signal; and
   monopulse processor means mounted in said first vehicle for collecting said second radar data signal received by said radiating element means.

2. The invention of claim 1 including computer processor means for producing said radar signal and data signal.

3. The invention of claim 2 including code generation means for encoding said radar signal and said data signal and selecting the operating frequency thereof.

4. The invention of claim 3 including frequency reference unit means for generating a waveform for use in the transmission of said encoded radar and radar data signal.

5. The invention of claim 4 wherein said antenna means includes an array of individually excitable radiating elements to generate said output beam.

6. The invention of claim 5 wherein said antenna means includes active module means for individually exciting each of said radiating elements.

7. The invention of claim 6 including corporate feed means for distributing said radar signal and said data signal to said radiating elements.

8. The invention of claim 7 including beam control computer means for generating phase and amplitude controls for each active module to control the direction of said beam.

9. The invention of claim 1 wherein said antenna means includes an array of individually excitable radiating elements to generate said output beam.

10. The invention of claim 9 wherein said antenna means includes active module means for individually exciting each of said radiating elements.

11. The invention of claim 1 wherein said data transmitter means includes data link computer means for initializing data transmission.

12. The invention of claim 1 including means for receiving radar data signal mounted on said first vehicle.

13. The invention of claim 12 wherein said means for receiving radar data signal includes an array of radiating elements to receive said radar data signal.

14. The invention of claim 13 including radar receiver means to downconvert said radar data signal to analog data signal.

15. The invention of claim 14 including radar signal processor means for converting said analog data signal to digital data signal.

16. The invention of claim 15 including radar data processor means for processing said digital data signal.

17. The invention of claim 12 wherein said data receiving means includes data link computer means for establishing a data link.

18. The invention of claim 12 including antenna means mounted on said first vehicle for receiving and processing radar signal.

19. The invention of claim 1 wherein said data receiving means mounted on said second vehicle includes antenna means for receiving said beam.

20. The invention of claim 19 including data link receiver means for downconverting said radar data signal to analog data signal.

21. The invention of claim 20 including signal processor means for converting said analog data signal to a digital data signal.

22. The invention of claim 21 including missile data computer means for processing said digital data signal.

23. The invention of claim 1 including data transmission means mounted on said second vehicle for transmitting data from said second vehicle.

24. The invention of claim 23 wherein said data transmission means mounted on said second vehicle includes missile data computer means for producing said data signal.

25. The invention of claim 24 including code generation means for randomly coding said data signal.

26. The invention of claim 25 including frequency reference unit means for generating a waveform for use in the transmission of said data signal.

27. The invention of claim 26 including data link transmitter means for providing said radar data signal to said antenna.

28. A two-way missile data link comprising:
   radar transmitter means mounted in a first vehicle for providing a radar signal;
   data transmitter means mounted in said first vehicle for providing a first radar data signal;
   radar receiver means mounted in said first vehicle for receiving and processing said radar signal;
   data receiver means mounted in said first vehicle for receiving and processing a second radar data signal transmitted from a second vehicle;
   said data receiver means including an array of radiating elements;
   array antenna means mounted in said first vehicle for electronically steering output beam containing said radar signal and said first radar data signal;
   said antenna means including active module means for receiving said second radar data signal from each radiating element;
   monopulse processor means for collecting said second radar data signal from said active module means;
   data receiving means mounted in said second vehicle for receiving said output beam and processing said first radar data signal; and
   data transmitter means mounted in said second vehicle for providing said second radar data signal.

* * * * *